United States Patent
Everaert et al.

(10) Patent No.: US 11,236,202 B2
(45) Date of Patent: Feb. 1, 2022

(54) METHODS OF PREPARING LOW TACK SOFT GEL COMPOSITIONS AND SUCH GEL COMPOSITIONS PREPARED THEREFROM

(71) Applicant: COMMSCOPE CONNECTIVITY BELGIUM BVBA, Kessel-Lo (BE)

(72) Inventors: Valja Everaert, Wetteren (BE); Kristel Van Renterghem, Kortrijk-Dustel (BE); Lydia Aertgeets, Begijnendijk (BE); Ana Nedelcheva Hristova, Holsbeek (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 21 days.

(21) Appl. No.: 16/768,342

(22) PCT Filed: Nov. 30, 2018

(86) PCT No.: PCT/EP2018/083194
§ 371 (c)(1),
(2) Date: May 29, 2020

(87) PCT Pub. No.: WO2019/106170
PCT Pub. Date: Jun. 6, 2019

(65) Prior Publication Data
US 2021/0171717 A1  Jun. 10, 2021

Related U.S. Application Data

(60) Provisional application No. 62/593,314, filed on Dec. 1, 2017.

(51) Int. Cl.
*C08L 83/04* (2006.01)
*C08G 77/14* (2006.01)
*C08J 3/24* (2006.01)

(52) U.S. Cl.
CPC ................ *C08G 77/14* (2013.01); *C08J 3/24* (2013.01); *C08L 83/04* (2013.01)

(58) Field of Classification Search
CPC ........ C08G 77/12; C08G 77/20; C08G 77/38; C08L 83/04; C08L 53/02; C08L 25/08
See application file for complete search history.

(56) References Cited

U.S. PATENT DOCUMENTS

| | | |
|---|---|---|
| 4,299,923 A | 11/1981 | Baskent et al. |
| 4,374,967 A | 2/1983 | Brown et al. |
| 5,442,004 A | 8/1995 | Sutherland et al. |
| 5,541,250 A | 7/1996 | Hudson et al. |
| 5,618,882 A | 4/1997 | Hammond et al. |
| 5,665,809 A | 9/1997 | Wojtowicz |
| 5,994,446 A | 11/1999 | Graulus et al. |
| 7,829,648 B2 | 11/2010 | Tanaka et al. |
| 7,897,666 B1 | 3/2011 | Berg |
| 8,642,891 B2 | 2/2014 | Berghmans et al. |
| 8,686,077 B2 | 4/2014 | Berg |
| 8,967,888 B2 | 3/2015 | Van Den Berg et al. |
| 9,556,336 B2 | 1/2017 | Berghmans et al. |
| 9,595,717 B2 | 3/2017 | Machida |
| 2008/0167432 A1 | 7/2008 | Ohara et al. |
| 2012/0101204 A1 | 4/2012 | Adams |
| 2013/0022567 A1 | 1/2013 | Murray et al. |
| 2014/0041893 A1 | 2/2014 | Adams et al. |
| 2015/0073059 A1* | 3/2015 | Knoer ...................... A61K 8/89 514/772.1 |
| 2017/0141431 A1 | 5/2017 | Machida |

FOREIGN PATENT DOCUMENTS

| | | |
|---|---|---|
| WO | 88/00603 A1 | 1/1988 |
| WO | 93/23472 A1 | 11/1993 |
| WO | 94/18273 A1 | 8/1994 |
| WO | 2012/175380 A1 | 12/2012 |
| WO | 2012/175526 A1 | 12/2012 |
| WO | 2013/160252 A2 | 10/2013 |

OTHER PUBLICATIONS

International Search Report and Written Opinion of the International Searching Authority for International Patent Application No. PCT/EP2018/083194 dated Jan. 29, 2019, 12 pages.

"Reactive Silicones: Forging New Polymer Links", Gelest Inc, XP002470135, Retrieved from the Internet: http://www.gelest.com/company/pdfs/reactivesilicones.pdf, 59 pages (2004).

\* cited by examiner

*Primary Examiner* — Kuo Liang Peng
(74) *Attorney, Agent, or Firm* — Merchant & Gould P.C.

(57) ABSTRACT

Disclosed herein are methods of preparing thermoplastic gels and dry silicone gels with an alkyl ester polydimethylsiloxane having a formula (I): (I) Also disclosed are thermoplastic gels and dry silicone gels prepared by the disclosed methods. In the formula (I), n is about 60% to about 90% of the formula (I); m is about 10% to about 40% of the formula (I); R is —(C=O)—OR$_1$; and R is a C$_2$-C$_{20}$ alkyl group. The alkyl ester polydimethylsiloxane has a weight average molecular weight of about 10,000 g/mol to about 50,000 g/mol. The hardness of the thermoplastic gels is less than 120 g peak load. The hardness of the dry silicone gels is less than 100 g peak load.

30 Claims, 1 Drawing Sheet

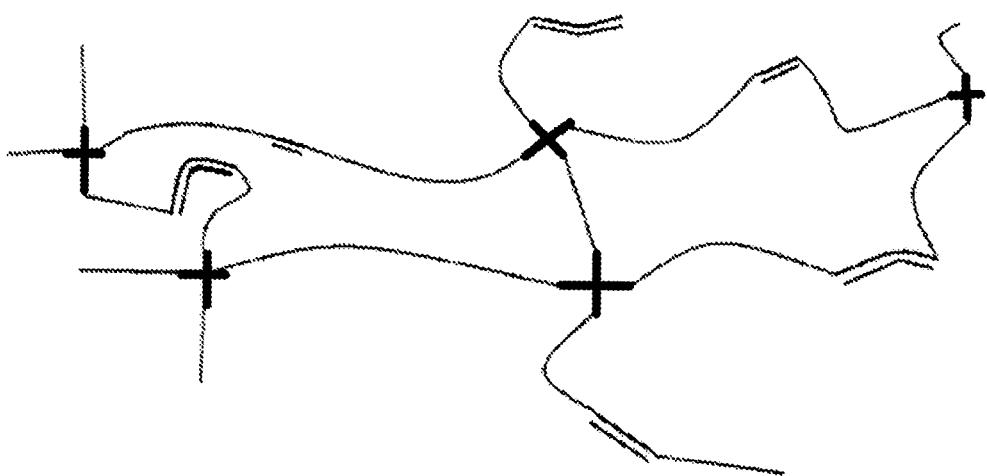

METHODS OF PREPARING LOW TACK SOFT GEL COMPOSITIONS AND SUCH GEL COMPOSITIONS PREPARED THEREFROM

CROSS-REFERENCE TO RELATED APPLICATION

This application is a National Stage Application of PCT/EP2018/083194, filed on Nov. 30, 2018, which claims the benefit of U.S. Patent Application Ser. No. 62/593,314, filed on Dec. 1, 2017, the disclosures of which are incorporated herein by reference in their entireties. To the extent appropriate, a claim of priority is made to each of the above disclosed applications.

TECHNICAL FIELD

The present disclosure relates generally to methods of preparing gel formulations and gel formulations prepared by such methods. In particular, the present disclosure relates to methods of preparing thermoplastic gel formulations exhibiting low tack and hardness less than 120 g peak load and such thermoplastic gel formulations prepared therefrom. The present disclosure also relates to methods of preparing dry silicone gel formulations exhibiting low tack and hardness less than 100 g peak load and such dry silicone gel formulations prepared therefrom.

BACKGROUND

Gel seal arrangements for fiber optic cables apply pressure to gel contained therein causing the gel to conform to the fiber optic cables and overcome any penetrating fluid pressure (e.g., from air or water). Softer gels used in cable gel seal arrangements as well as for sealing enclosures are subject to significant tackiness. For example, dry silicone gels suffer from an extremely high level of tackiness/stickiness which increases the softer the gel becomes. Consequently, handling of the gels becomes difficult. For example, the gels are difficult to handle and cut. Also, re-entry of fiber optic closures in the field after first installation is not possible in view of the tackiness/stickiness, although re-entry is key in some applications as a fiber optic network is constantly changing and additional customers need to be added over time.

For both thermoplastic gel formulations and dry silicone gel formulations, there is a need for improved soft gel formulations having a lower hardness that also exhibit a sufficiently low tack. There is also a need for improved soft gel formulations that can be more easily handled (e.g., more easily cut during manufacturing, and suitably used for re-entry operations).

SUMMARY

Disclosed herein is a method of preparing a thermoplastic gel. The method comprises preparing a composition comprising a styrene triblock copolymer, a styrene diblock copolymer, or a combination thereof; and an oil extender to provide a pre-swell. The method further comprises shaping the pre-swell to provide a shaped thermoplastic gel. The method additionally comprises treating a surface of the shaped thermoplastic gel with an alkyl ester polydimethylsiloxane having a formula (I) to provide the thermoplastic gel:

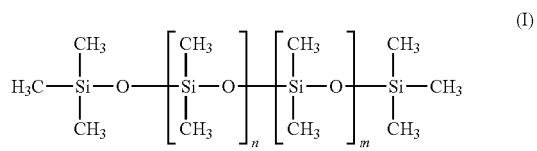

In the formula (I), n is about 60% to about 90% of the formula (I); m is about 10% to about 40% of the formula (I); R is $-(C=O)-OR_1$; and $R_1$ is a $C_2$-$C_{20}$ alkyl group. The alkyl ester polydimethylsiloxane has a weight average molecular weight of about 10,000 g/mol to about 50,000 g/mol. The hardness of the thermoplastic gel is less than 120 g peak load.

Disclosed herein is another method of preparing a thermoplastic gel. The method comprises preparing a composition comprising a styrene triblock copolymer, a styrene diblock copolymer, or a combination thereof; and an oil extender to provide a pre-swell. The method further comprises mixing into the pre-swell an alkyl ester polydimethylsiloxane having a formula (I) to provide the thermoplastic gel:

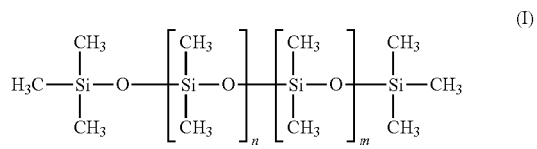

In the formula (I), n is about 60% to about 90% of the formula (I); m is about 10% to about 40% of the formula (I); R is $-(C=O)-OR_1$; and $R_1$ is a $C_2$-$C_{20}$ alkyl group. The alkyl ester polydimethylsiloxane has a weight average molecular weight of about 10,000 g/mol to about 50,000 g/mol. The hardness of the thermoplastic gel is less than 120 g peak load.

Also disclosed herein are thermoplastic gels prepared by the methods disclosed herein.

Disclosed herein is a method of preparing a dry silicone gel. The method comprises preparing an uncured silicone gel composition. The method further comprises curing the uncured silicone gel composition to provide a cured silicone gel comprising crosslinked silicone polymers having a Si—O backbone. The method further comprises treating a surface of the cured silicone gel with an alkyl ester polydimethylsiloxane having a formula (I) to provide the dry silicone gel:

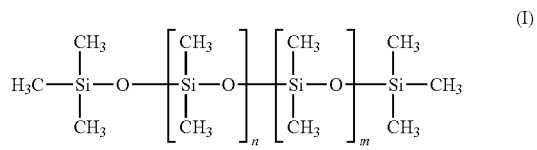

In the formula (I), n is about 60% to about 90% of the formula (I); m is about 10% to about 40% of the formula (I); R is $-(C=O)-OR_1$; and $R_1$ is a $C_2$-$C_{20}$ alkyl group. The alkyl ester polydimethylsiloxane has a weight average molecular weight of about 10,000 g/mol to about 50,000 g/mol. The hardness of the dry silicone gel is less than 100 g peak load.

Disclosed herein is another method of preparing a dry silicone gel. The method comprises preparing an uncured silicone gel composition. The method further comprises, after a start of reaction but prior to curing, treating a surface of the composition with an alkyl ester polydimethylsiloxane having a formula (I):

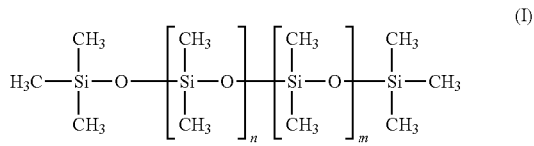

In the formula (I), n is about 60% to about 90% of the formula (I); m is about 10% to about 40% of the formula (I); R is —(C=O)—OR$_1$; and R$_1$ is a C$_2$-C$_{20}$ alkyl group. The alkyl ester polydimethylsiloxane has a weight average molecular weight of about 10,000 g/mol to about 50,000 g/mol. The method additionally comprises curing the composition to provide the dry silicone gel comprising cross-linked silicone polymers having a Si—O backbone. The hardness of the dry silicone gel is less than 100 g peak load.

Disclosed herein is yet another method of preparing a dry silicone gel. The method comprises preparing an uncured silicone gel composition. The method further comprises, prior to curing the uncured silicone gel composition, mixing into the uncured silicone gel composition an alkyl ester polydimethylsiloxane having a formula (I):

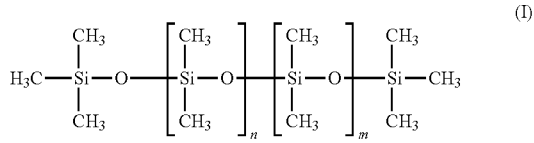

In the formula (I), n is about 60% to about 90% of the formula (I); m is about 10% to about 40% of the formula (I); R is —(C=O)—OR$_1$; and R$_1$ is a C$_2$-C$_{20}$ alkyl group. The alkyl ester polydimethylsiloxane has a weight average molecular weight of about 10,000 g/mol to about 50,000 g/mol. The method additionally comprises curing the composition to provide the dry silicone gel comprising cross-linked silicone polymers having a Si—O backbone. The hardness of the dry silicone gel is less than 100 g peak load.

Further disclosed herein are dry silicone gels prepared by the methods disclosed herein.

BRIEF DESCRIPTION OF THE DRAWINGS

FIG. 1 shows a schematic overview of a silicone gel prepared comprising reaction of crosslinker compounds represented by "+", chain extender compounds represented by "=", and base polymer V-PDMS compounds represented by "-"

DETAILED DESCRIPTION

Aspects of the present disclosure relate to methods of preparing soft gels having reduced tackiness without compromising the hardness characteristics of the gel. For example, aspects of the present disclosure relate to methods of preparing soft gels having a hardness less than 120 g peak load or a hardness less than 100 g peak load and low tackiness with tack times of 2 seconds or less or 1 second or less and/or adhesiveness less than 20 mJ. Furthermore, the gels can better maintain their reduced tackiness over time, and in some cases, permanently.

Aspects of the present disclosure further relate to methods of preparing gels having an additive dispersed throughout the gel or, alternatively, on the surface of the gel. Therefore, the additive can provides a softer gel with improved handling (e.g., easier cutting and manufacturing operations, and easier re-entry in the field).

The inventors have discovered that adding a small amount of an alkyl ester polydimethylsiloxane to the gel surface directly, either before or after curing, provides a significantly reduced tackiness without compromising the hardness characteristics of the gel. Thus, the gels disclosed herein can be manufactured with ease (e.g., by spraying, painting, or brushing the additive onto the gel surface).

The inventors have further discovered that adding the alkyl ester polydimethylsiloxane to the gel surface after curing is very effective. For example, by this method, only small amounts of the alkyl ester polydimethylsiloxane need to be added to achieve reduced tackiness without compromising the hardness characteristics.

Adding the alkyl ester polydimethylsiloxane to the gel surface before curing (but after a start of reaction in the uncured composition) is also effective.

The inventors have also discovered that mixing a small amount of an alkyl ester polydimethylsiloxane into a gel composition, after mixing the gel components but prior to curing, advantageously provides reduced tackiness without compromising the hardness of the gel. Mixing the alkyl ester polydimethylsiloxane into the uncured gel composition prior to curing can also impart reduced tackiness throughout the body of the gel. This preparation method is beneficial when the gel needs to be cut or otherwise handled, either during manufacturing or by a user. Importantly, mixing the alkyl ester polydimethylsiloxane with other gel-forming components during preparation of the uncured gel composition is not effective.

As used herein, the term "curing" refers to chemical crosslinking of polymer chains upon introduction of some type of reaction accelerant such as heat or UV light. Thus, "curing" is distinguished from reaction and crosslinking that occurs at room temperature. "Curing" requires some kind of accelerant of the reaction. "Curing" does not occur upon mere mixing of gel-forming components.

As used herein, "preparing an uncured composition" refers to mixing gel-forming components to prepare the uncured composition. There is no limitation on the method of mixing. For example, all gel-forming components can be mixed together simultaneously or gel-forming components can be mixed together sequentially.

As used herein, "shaping" refers to any method that can be used to impart a shape to a thermoplastic gel, for example, molding or extruding.

In regard to thermoplastic gels, providing a pre-swell generally involves mixing the styrene triblock copolymer, the styrene diblock copolymer, or a combination thereof with the oil extender and allowing the mixture to sit at room temperature. There is no limitation on the method of mixing. For example, all gel-forming components can be mixed together simultaneously or gel-forming components can be mixed together sequentially.

Alkyl Ester Polydimethylsiloxane Additive

The alkyl ester polydimethylsiloxane additive used in the gel preparation methods disclosed herein has the formula (I):

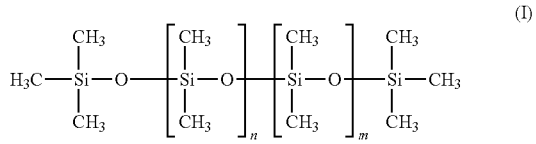

(I)

In the formula (I), n is about 60% to about 90% of the formula (I). In embodiments, n is about 70% to about 80% of the formula (I). In the formula (I), m is about 10% to about 40% of the formula (I). In embodiments, m is about 20% to about 30% of the formula (I). For example, n can be about 75% of the formula (I) and m can be about 25% of the formula (I). In the formula (I), R is —(C=O)—OR$_1$ and R$_1$ is a C$_2$-C$_{20}$ alkyl group. In embodiments, R$_1$ is a C$_2$-C$_{18}$ alkyl group. In embodiments, R$_1$ is a C$_2$-C$_{16}$ alkyl group. In embodiments, R$_1$ is a C$_4$-C$_{20}$ alkyl group. In embodiments, R$_1$ is a C$_4$-C$_{18}$ alkyl group. In embodiments, R$_1$ is a C$_4$-C$_{16}$ alkyl group. In embodiments, R$_1$ is a C$_6$-C$_{20}$ alkyl group. In embodiments, R$_1$ is a C$_6$-C$_{18}$ is alkyl group. In embodiments, R$_1$ is a C$_6$-C$_{16}$ alkyl group. In embodiments, R$_1$ is a C$_9$-C$_{20}$ alkyl group. In embodiments, R$_1$ is a C$_9$-C$_{18}$ alkyl group. In embodiments, R$_1$ is a C$_9$-C$_{16}$ alkyl group. In embodiments, R$_1$ is a C$_1$-C$_{20}$ alkyl group. In embodiments, R$_1$ is a C$_1$-C$_{18}$ alkyl group. In embodiments, R$_1$ is a C$_1$-C$_{16}$ alkyl group. Generally, R$_1$ is a linear alkyl group. However, R$_1$ can be a combination of linear alkyl groups and branched alkyl groups.

In the formula (I), R$_1$ can also be a C$_2$-C$_{20}$ alkenyl group. In embodiments, R$_1$ can be a C$_3$-C$_{20}$ alkenyl group. In embodiments, R$_1$ can be a C$_4$-C$_{20}$ alkenyl group. In embodiments, R$_1$ can be a C$_2$-C$_{18}$ alkenyl group, a C$_2$-C$_{16}$ alkenyl group, a C$_3$-C$_{18}$ alkenyl group, a C$_3$-C$_{16}$ alkenyl group, a C$_4$-C$_{18}$ alkenyl group, a C$_4$-C$_{16}$ alkenyl group, a C$_6$-C$_{20}$ alkenyl group, a C$_6$-C$_{15}$ alkenyl group, a C$_6$-C$_{16}$ alkenyl group, a C$_9$-C$_{20}$ alkenyl group, a C$_9$-C$_{18}$ alkenyl group, or a C$_9$-C$_{16}$ alkenyl group. Generally, R$_1$ is a linear alkenyl group. However, R$_1$ can be a combination of linear alkenyl groups and branched alkenyl groups.

As used herein, an "alkenyl group" can have one or more carbon-carbon double bonds. For example, an "alkenyl group" can be an alkadienyl group (i.e., having two carbon-carbon double bonds). For example, R$_1$ can be a C$_4$-C$_{20}$ alkadienyl group.

In reference to the above, R$_1$ can be an alkyl group, an alkenyl group, or combinations thereof.

In embodiments, the alkyl ester polydimethylsiloxane additive can contain hexadecene as an impurity in an amount between about 0.01 wt % and about 5 wt %.

In embodiments, the weight average molecular weight of the alkyl ester polydimethylsiloxane is in the range of about 10,000 g/mol to about 50,000 g/mol. In embodiments, the weight average molecular weight of the alkyl ester polydimethylsiloxane is in the range of about 15,000 g/mol to about 45,000 g/mol. In embodiments, the weight average molecular weight of the alkyl ester polydimethylsiloxane is in the range of about 20,000 g/mol to about 40,000 g/mol. In embodiments, the weight average molecular weight of the alkyl ester polydimethylsiloxane is in the range of about 25,000 g/mol to about 35,000 g/mol.

In some embodiments, the gel comprises about 0.01 wt % to about 2 wt % of the additive, about 0.1 wt % to about 2 wt % of the additive, about 0.01 wt % to about 1.5 wt % of the additive, about 0.1 wt % to about 1.5 wt % of the additive, about 0.01 wt % to about 1.3 wt %, about 0.1 wt % to about 1.3 wt %, about 0.01 wt % to about 1 wt % of the additive, about 0.1 wt % to about 1 wt %, about 0.01 wt % to about 0.7 wt %, or about 0.1 wt % to about 0.7 wt %. In some embodiments, the gel comprises about 2 wt % of the additive. In some embodiments, the gel comprises about 1 wt % of the additive. In some embodiments, the gel comprises about 0.1 wt % of the additive. In some embodiments, the gel comprises about 0.01 wt % of the additive. In some embodiments, the gel comprises about 0.01 wt % to about 0.1 wt % of the additive. In other embodiments, the gel comprises from about 1 wt % to about 2 wt % of the additive. In other embodiments, the gel comprises about 0.7 wt % to about 1.3 wt % of the additive. These weight percentages are based on the final gel weight.

Thermoplastic Gel

The thermoplastic gel prepared by the methods disclosed herein has a hardness of less than 120 g peak load. In embodiments, the thermoplastic gel has a hardness of less than 110 g peak load. In embodiments, the thermoplastic gel has a hardness of less than 100 g peak load.

In embodiments, the thermoplastic gel prepared by the methods disclosed herein has a tack time of about 2 seconds or less. In embodiments, the thermoplastic gel has a tack time of about 1 second or less. In embodiments, the thermoplastic gel has a tack time of less than 2 seconds. In embodiments, the thermoplastic gel has a tack time of less than 1 second.

In embodiments, the thermoplastic gel prepared by the methods disclosed herein has an adhesiveness less than 20 mJ. In embodiments, the thermoplastic gel has an adhesiveness less than 10 mJ. In embodiments, the thermoplastic gel has an adhesiveness less than 5 mJ. In embodiments, the thermoplastic gel has an adhesiveness less than 1 mJ. In embodiments, the thermoplastic gel has an adhesiveness less than 0.75 mJ.

As used herein, the term "styrene diblock copolymer" refers to a diblock copolymer having a polystyrene segment and another elastomeric segment. Styrene diblock copolymers are known. Examples of a "styrene diblock copolymer" include poly(styrene-ethylene/propylene) (SEP), poly(styrene-ethylene/butylene), and combinations thereof. Other examples of a "styrene diblock copolymer" include poly(styrene-butadiene) and poly(styrene-isoprene). The styrene diblock copolymer can have about 25 wt % to about 40 wt % styrene, for example, between about 30 wt % and about 40 wt % styrene or between about 35 wt % and about 40 wt % styrene.

As used herein, the term "styrene triblock copolymer" refers to a triblock copolymer having polystyrene end segments and another elastomeric center segment. Styrene triblock copolymers are known. Examples of a "styrene triblock copolymer" include poly(styrene-butadiene-styrene) (SBS), poly(styrene-ethylene/butylene-styrene) (SEBS), poly(styrene-ethylene/propylene-styrene) (SEPS), poly(styrene-ethylene/ethylene-propylene-styrene) (SEEPS), and combinations thereof. Another example of a "styrene triblock copolymer" is poly(styrene-isoprene-styrene) (SIS). The styrene triblock copolymer can have about 25 wt % to about 40 wt % styrene, for example, between about 30 wt % and about 40 wt % styrene or between about 35 wt % and about 40 wt % styrene.

In embodiments where the thermoplastic gel is with both a styrene triblock copolymer and a styrene diblock copolymer, about 10 wt % to about 20 wt % of the styrene triblock copolymer and about 4 wt % to about 10 wt % of the styrene diblock copolymer can be used in combination. For example, about 12 wt % to about 16 wt % of the styrene triblock copolymer and about 5 wt % to about 7 wt % of the styrene diblock copolymer can be used in combination.

In some embodiments, a combination of SEPS triblock copolymer and SEP diblock copolymer is used. In some embodiments, two or more types of SEPS triblock copolymers are used. In some embodiments, two types of SEPS triblock copolymers are used.

In some embodiments, from about 10 wt % to about 20 wt % of the styrene triblock copolymer is used. For example, from about 15 wt % to about 20 wt % of the styrene triblock copolymer can be used.

About 60 wt % to about 90 wt % of the oil extender can be used. For example, about 70 wt % to about 85 wt % of the oil extender can be used. As another example, about 75 wt % to about 85 wt % of the oil extender can be used. As yet another example, about 75 wt % to about 81 wt % of the oil extender can be used. The oil extender may be selected from oils conventionally used to extend copolymer materials and are known in the art. The oil may be a hydrocarbon oil such as paraffinic oil, naphthenic oil, or polyalphaolefin (PAO) oil such as polydecene, polydodecene, or polytetradecene; a synthetic oil such as polybutene or polypropene oil, and mixtures thereof. For example, the oil extender can be a mixture of a non-aromatic paraffin and a naphthenic hydrocarbon oil.

Dry Silicone Gel

The dry silicone gel prepared by the methods disclosed herein has a hardness of less than 100 g peak load. In embodiments, the dry silicone gel has a hardness of less than 75 g peak load. In embodiments, the dry silicone gel has a hardness of less than 70 g peak load.

In embodiments, the dry silicone gel prepared by the methods disclosed herein has a tack time of about 2 seconds or less. In embodiments, the dry silicone gel has a tack time of about 1 second or less. In embodiments, the dry silicone gel has a tack time of less than 2 seconds. In embodiments, the dry silicone gel has a tack time of less than 1 second.

In embodiments, the dry silicone gel prepared by the methods disclosed herein has an adhesiveness less than 20 mJ. In embodiments, the dry silicone gel has an adhesiveness less than 10 mJ. In embodiments, the dry silicone gel has an adhesiveness less than 5 mJ.

As used herein, a "dry silicone gel" has crosslinked silicone polymers having a Si—O backbone and does not include any diluent fluid such as silicone oil or mineral oil. As opposed to carbon-based polymer, the crosslinked silicone polymer of dry silicone gels are based on a Si—O backbone. The characteristics of silicon and oxygen provide crosslinked polymers with their exceptional properties. For example, silicon forms stable tetrahedral structures, and silicon-oxygen bonds are relatively strong which results in dry silicone gels with high temperature and creep resistance. In addition, crosslinked Si—O polymers have a relatively high chain flexibility as well as low rotational energy barrier.

The dry silicone gels may be made according to a number of different polymerization reactions. In certain embodiments, the polymerization reaction is a hydrosilylation reaction, also referred to as a hydrosilation reaction. In some embodiments, the hydrosilylation reaction makes use of a platinum catalyst, while other embodiments make use of radicals. In further embodiments, the dry silicone gel is made by a dehydrogenated coupling reaction. In other embodiments, the dry silicone gel is made by a condensation cure RTV reaction.

In embodiments, the uncured silicone gel composition prepared in the methods disclosed herein comprises a base polymer having a Si-vinyl group. In other embodiments, the uncured silicone gel composition prepared in the methods disclosed herein comprises monomers that upon a chemical reaction and crosslinking provide crosslinked silicone polymers having a Si—O backbone. In embodiments, preparing the uncured silicone gel composition comprises mixing a base polymer having a Si-vinyl group (e.g., a vinyl-terminated polydimethylsiloxane), a crosslinker, and a chain extender.

In certain embodiments, the dry silicone gel is made by an addition cure or platinum cure reaction mechanism. In some embodiments, the mechanism employs the use of a catalyst. By using a catalyst, the activation energy of the reaction is lowered and faster curing times at lower temperatures can be achieved. A schematic overview of the platinum cure reaction mechanism is shown below in (I).

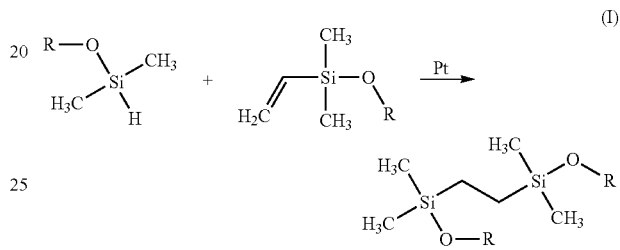

(I)

For the reaction in (I) to be made possible, two functional groups must react with each other. In certain embodiments, the two functionalities are (1) the Si—H group and (2) the Si-vinyl group. These two functionalities may be provided by: (1) a base polymer, (2) a crosslinker, and (3) a chain extender.

Base Polymer

In certain embodiments, the Si-vinyl group is provided by a base polymer such as a vinyl terminated polydimethylsiloxane (otherwise referred to as "V-PDMS"), which is shown below in (II). In this example, the base polymer compound comprises a vinyl group at each end of the compound.

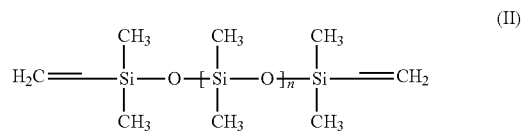

(II)

In certain embodiments, the molecular weight of the base polymer is controlled through anionic ring-opening polymerization of cyclic siloxanes in the presence of alkali-metal hydroxide of a base that is volatile (e.g., tetramethylammonium silanolate). Encapping of the PDMS with a vinyl group is needed, so these groups are added to the polymerization mixture. V-PDMS together with the chain extender determine the molecular weight between the different crosslink sites.

The vinyl-containing base polymer, such as V-PDMS, may have different viscosities that affect the resulting dry silicone gel. In general a high molecular weight V-PDMS will produce an uncured gel with a higher viscosity. In certain embodiments, a lower molecular weight V-PDMS generally improves processability.

The hardness of the dry silicone gel depends upon the number of vinyl groups that are unreacted both at the surface of the gel and inside the gel. The excess unreacted vinyl groups result in the gel being softer and also causes the gel to be subject to tackiness.

Crosslinker

In certain embodiments, the Si—H end groups for the reaction in (I) may be provided by a crosslinker and/or a chain extender. A crosslinker is capable of forming connections between vinyl-terminated polydimethylsiloxane chains. In certain embodiments, the crosslinker includes electronegative substituents such as alkylsiloxy or chlorine. In one embodiment, the crosslinker comprises four Si—H groups that are capable of forming a connection point between four different vinyl-terminated polydimethylsiloxane chains. In some embodiments, the crosslinker is tetrakis(dimethylsiloxy)silane, shown below in (III).

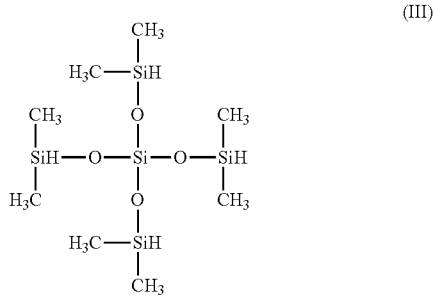

(III)

In other embodiments, the crosslinker is methyltris(dimethylsiloxy)silane. Other crosslinkers may also be used. Using higher functional crosslinkers is also possible, but these form less defined polymer structures.

Chain Extender

In addition to the crosslinker, the Si—H end group may be provided by a chain extender, wherein both ends of the chain extender compound are terminated with a Si—H group.

In certain embodiments, the chain extender comprises reactive groups that are compatible and are willing to react with the vinyl groups in the base polymer. Just as for the crosslinker, these groups are Si—H groups that can react in a hydrosilation reaction. The chain extender typically includes two functional groups; however, the chain extender may include three of more functional groups, such that the chain extender functions as a branching agent. The functional groups may be the same as or different from each other. The functional groups may also be the same as or different than the functional groups of the first component and/or the second component.

The chain extender may be any chain extender known in the art. In one embodiment, the chain extender is a hydride containing polydimethylsiloxane. In another embodiment, the chain extender is a hydride terminated polydimethylsiloxane, shown below in (IV).

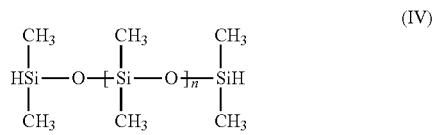

(IV)

In a further embodiment, the chain extender is a hydride terminated polyphenylmethylsiloxane. In another embodiment, the chain extender is a hydride terminated polydiphenylsiloxane. In yet another embodiment, the chain extender is a dihydride containing siloxane. The chain extender may have a high molecular weight or a low molecular weight. The chain extender may also be branched or unbranched. In other embodiments, the chain extender is a high molecular weight polydimethylsiloxane. In other embodiments, the chain extender is a low molecular weight polydimethylsiloxane.

In other embodiments, the chain extender is a functionally-terminated silicone such as a silanol terminated, vinyl terminated, and amino terminated polydimethylsiloxane. Such silicones have low tear strength and can be toughened by incorporating fumed silica (SiO2) into the structure. For example, an alkoxy-functionalized siloxane can be included. Suitable alkoxy-functionalized siloxanes include polydiethoxysiloxane, tetraethoxy silane, tetramethoxy silane, and polydimethoxy siloxane. In other embodiments, the chain extender is a fluorosilicone, phenyl silicone, or a branching diethyl silicone.

In certain embodiments, by making use of the chain extender molecule, the V-PDMS base polymer can be shorter because the H-PDMS chain extender will extend the V-PDMS base polymer chain in situ between two crosslinker compounds. By using this mechanism, a V-PDMS chain of a shorter length can be applied which leads to lower viscosities and compounds that are easier to work with. Therefore, lower viscosity base polymer compounds can be used unlike a peroxide activated cure reaction mechanism.

MFHC and H/V Ratios

The amounts of crosslinker and chain extender that provide the hydride component may be varied. In certain embodiments, the amount of hydride in the gel is defined in terms of the mole fraction of hydride present as crosslinker ("MFHC"). For example, when the MFHC value is 0.3 or 30%, this means that 30% of the hydrides present in the system are part of the crosslinker and the remaining 70% of the hydrides are provided by the chain extender. In certain embodiments, the MFHC ratio may be altered to adjust the hardness of the gel (i.e., an increase in the MFHC may increase the hardness).

The overall amount of hydride components in the gel can also vary. The ratio of hydride to vinyl components (provided by the base polymer) can be defined as "H/V". In other words, H/V is the total moles of hydride (contributions from crosslinker and chain extender) divided by the amount in moles of vinyl from the base polymer (e.g., V-PDMS) present.

A schematic overview of the reaction is depicted in (V) as shown in FIG. 1, wherein the crosslinker compounds are represented by "+", the chain extender compounds are represented by "=", and the base polymer V-PDMS compounds are represented by "-". In certain embodiments, the chain extender must always connect two different base polymer compounds, or connect to one base polymer and terminate the chain on the opposite end.

Catalyst

In certain embodiments, an addition cure catalyst is used in reacting the base polymer, crosslinker, and chain extender. Performing the reaction without using a catalyst is typically a very energy consuming process. Temperatures of 300° C. or even higher are needed in order to avoid the produced gel having poor and inconsistent mechanical properties.

In certain embodiments, the catalyst comprises platinum. For example, the catalyst can be made of Pt complexed with divinyltetramethyldisiloxane, shown below in (VI).

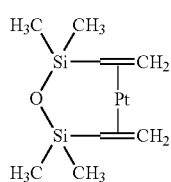

Measurement of Hardness

Hardness is peak load is as measured by a standard texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force (peak load) needed to push the probe into the test sample.

Hardness is evaluated with a stainless steel ball diameter 6.35 mm, trigger point: 4 grams, probe speed: 2 mm/sec, target depth: 4 mm, and hold time: 60 sec.

Measurement of Tack Time and Adhesiveness

Both tack time and adhesiveness are evaluated with an ALU probe (diameter 20 mm), trigger load: 4 grams, probe speed: 2 mm/sec, and hold time: 15 sec.

From the foregoing detailed description, it will be evident that modifications and variations can be made to the methods and gels disclosed herein without departing from the spirit or scope of the disclosure.

What is claimed is:

1. A method of preparing a low tack soft polymer gel, comprising:
   preparing a polymer gel composition; and
   treating the polymer gel composition with an alkyl ester polydimethylsiloxane having a formula (I):

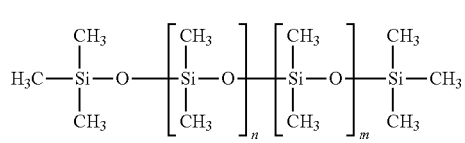

where
   n is about 60% to about 90% of the formula (I);
   m is about 10% to about 40% of the formula (I);
   R is —(C═O)—OR$_1$; and
   R$_1$ is a C$_2$-C$_{20}$ alkyl group,
wherein the alkyl ester polydimethylsiloxane has a weight average molecular weight of about 10,000 g/mol to about 50,000 g/mol,
   to provide the low tack soft polymer gel.

2. The method of claim 1, wherein the low tack soft polymer gel has a tack time of about 2 seconds or less.

3. The method of claim 2, wherein the low tack soft polymer gel has a tack time of about 1 second or less.

4. The method of claim 1, wherein the low tack soft polymer gel has an adhesiveness less than 20 mJ.

5. The method of claim 1, wherein n is about 70% to about 80% of the formula (I).

6. The method of claim 1, wherein m is about 20% to about 30% of the formula (I).

7. The method of claim 1, wherein the alkyl ester polydimethylsiloxane has a weight average molecular weight of about 15,000 g/mol to about 45,000 g/mol.

8. The method of claim 1, wherein the alkyl ester polydimethylsiloxane has a weight average molecular weight of about 20,000 g/mol to about 40,000 g/mol.

9. The method of claim 8, wherein the alkyl ester polydimethylsiloxane has a weight average molecular weight of about 25,000 g/mol to about 35,000 g/mol.

10. The method of claim 9, wherein the alkyl ester polydimethylsiloxane has a weight average molecular weight between about 31,000 and about 33,000.

11. The method of claim 1, wherein R$_1$ is a C$_9$ to C$_{18}$ alkyl group.

12. The method of claim 1, wherein the alkyl ester polydimethylsiloxane has a number average molecular weight between about 13,000 and about 14,000.

13. The method of claim 1, wherein the alkyl ester polydimethylsiloxane has a polydispersity index between about 2 and about 3.

14. The method of claim 13, wherein the alkyl ester polydimethylsiloxane has a polydispersity index between about 2.3 and about 2.4.

15. The method of claim 1, wherein the low tack soft polymer gel exhibits a hardness of less than 120 g peak load.

16. The method of claim 1, wherein the polymer gel composition is selected from the group consisting of a thermoplastic gel composition and a silicone gel composition.

17. The method of claim 16, wherein the preparing of the silicone gel composition comprises
   preparing an uncured silicone gel composition; and
   curing the uncured silicone gel composition to provide a cured silicone gel comprising crosslinked silicone polymers having a Si—O backbone.

18. The method of claim 17, wherein preparing the uncured silicone gel composition comprises mixing a base polymer having a Si-vinyl group, a crosslinker, and a chain extender.

19. The method of claim 18, wherein the base polymer is a vinyl-terminated polydimethylsiloxane.

20. The method of claim 17, wherein the treating comprises
   treating the cured silicone gel or uncured silicone gel composition with the alkyl ester polydimethylsiloxane of formula (I) to provide the low tack soft polymer gel.

21. The method of claim 20, wherein the treating comprises
   treating a surface of the cured silicone gel or uncured silicone gel composition with the alkyl ester polydimethylsiloxane of formula (I).

22. The method of claim 20, wherein the treating comprises mixing into the uncured silicone gel composition the alkyl ester polydimethylsiloxane having a formula (I).

23. The method of claim 16, wherein the silicone gel composition is a dry silicone gel composition.

24. The method of claim 16, wherein the preparing of the thermoplastic gel composition comprises
   mixing a styrene triblock copolymer, a styrene diblock copolymer, or a combination thereof, with an oil extender to provide a pre-swell.

25. The method of claim 24, wherein the styrene triblock copolymer is selected from poly(styrene-butadiene-styrene), poly(styrene-ethylene/butylene-styrene), poly(styrene-ethylene/propylene-styrene), poly(styrene-ethylene/ethylene-propylene-styrene), poly(styrene-isoprene-styrene), and combinations thereof.

26. The method of claim 24, wherein the styrene diblock copolymer is selected from poly(styrene-ethylene/propylene), poly(styrene-ethylene/butylene), and combinations thereof.

27. The method of claim 24, wherein the treating comprises
    treating the pre-swell with the alkyl ester polydimethylsiloxane of formula (I).

28. The method of claim 27, wherein the treating of the pre-swell comprises
    mixing into the pre-swell the alkyl ester polydimethylsiloxane of formula (I) to provide the low tack soft polymer gel.

29. The method of claim 24, further comprising shaping the pre-swell to provide a shaped thermoplastic gel.

30. The method of claim 29, wherein the treating comprises
    treating a surface of the shaped thermoplastic gel with the alkyl ester polydimethylsiloxane having a formula (I) to provide the low tack soft polymer gel.

\* \* \* \* \*